Sept. 11, 1928.

J. J. HENNESSY 1,683,616

LUBRICATOR DISTRIBUTOR

Filed Dec. 4, 1923

Inventor.
JAMES J. HENNESSY.
by Cornwall, Bedell & Janus,
His Attorneys.

Patented Sept. 11, 1928.

1,683,616

UNITED STATES PATENT OFFICE.

JAMES J. HENNESSY, OF NEW YORK, N. Y.

LUBRICATOR DISTRIBUTOR.

Application filed December 4, 1923. Serial No. 678,428.

My invention relates to journal lubricators such as are adapted to be used on railroad rolling stock and consists in an improved structure whereby lubricant may be supplied from a reservoir to a journal to be lubricated and distributed to the latter evenly and thoroughly and without loss.

In Patent No. 1,446,710 issued to me May 23, 1922, I illustrate a journal lubricator in which the shifting movement of the journal in the lubricator is utilized to pump lubricant from a reservoir to the surface of the journal. This lubricator is provided with an elevated pan adapted to be packed with cotton waste whereby the lubricant may be distributed and retained in contact with the journal.

The object of my present invention is to provide a better retainer and a better bearing distributing surface for the lubricator than that shown in the above-mentioned patent and other such constructions. By means of my invention lubricant will be distributed in a reliable manner even where high temperatures are encountered and the lubricant accordingly reduced below a normal viscosity.

In the accompanying drawings I illustrate a pump operated similarly to that shown in the above-mentioned patent in connection with my improved distributor but it will be understood that any practical means of supplying lubricant to the distributor may be used therewith without departing from the spirit of my invention.

In these drawings—

Figure 1:
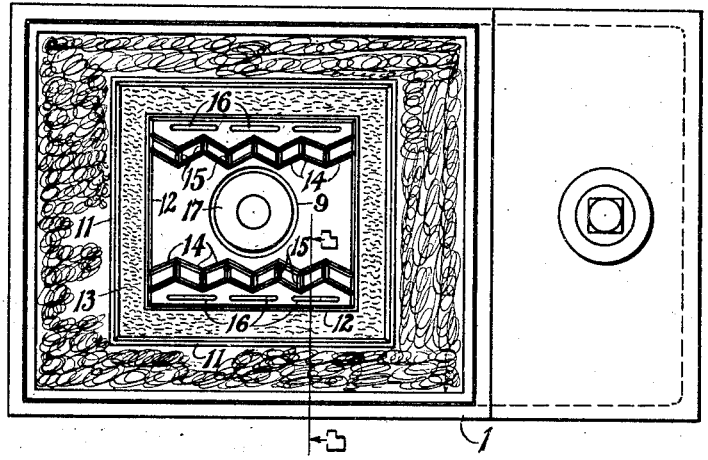
Figure 1 is a top view of the distributor plate in position in the body of the lubricator.
Figure 2:
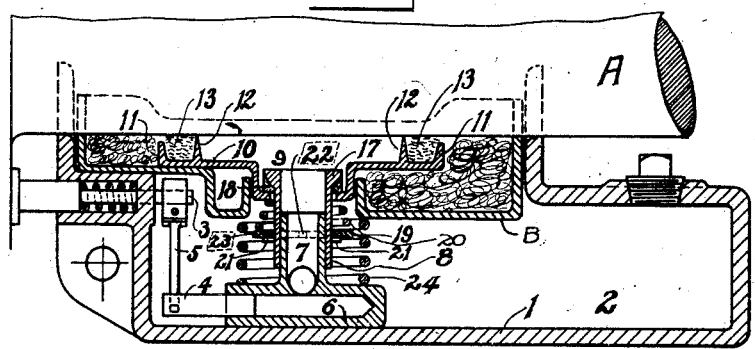
Figure 2 is a longitudinal vertical section through the center of the lubricator, the section through the distributor being slightly distorted in part to better illustrate its construction.
Figure 4:
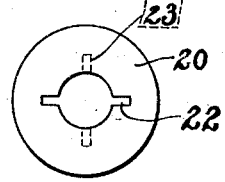
Figure 4 is a detail view of a part shown in Figure 2.
Figure 3:
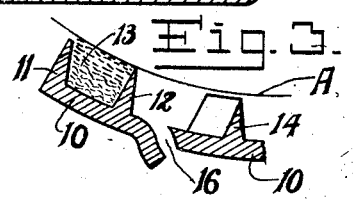
Figure 3 is a detail section taken on line 3—3 of Figure 1.

The lubricator body 1 comprises a lubricant reservoir 2, pumping mechanism consisting of a contact rod 3, and a piston 4 connected by a bar 5, the piston operating in a cylinder 6 to force lubricant upwardly through a passage 7 in body 1 and through a tube 8 to a well 9 formed in the distributor 10 which is adapted to be positioned centrally of a sub-cellar B which is yieldingly supported by a coil spring 24 seated upon a suitable surface of body 1.

The distributor 10 is rectangular and is concaved transversely to follow the contour of the journal A to which the lubricator is applied. The sides of the distributor terminate in inverted V-shaped ridges 11, the edges of which may contact with the journal and parallel with these sides are respective ridges 12 cooperating with side ridges 11 to form a recess in which felt 13 or other suitable material may be packed to form a seal between the interior and exterior of the distributor.

Extending lengthwise of the distributor are zig-zag ridges 14 each shaped like an inverted V but with their apices of slightly less height originally than the apices of ridges 12. These zig-zag ridges 14 are connected at intervals by short transverse ridges 15 similar in shape and height. These ridges 14 and 15 form a plurality of pockets between themselves and between ridges 14 and ridges 12. These pockets are located above the lowest portion of the distributor so that lubricant adhering to the journal, elevated as the latter rotates, is trapped in these pockets and prevented from accumulating at the bottom of the distributor to the exclusion of the upturned portion thereof.

The shape and heights of ridges 12, 14 and 15 are such that when the distributor is applied to a journal it will quickly wear the perimetric ridges 12 into a line contact extending all around the distributor. Thereafter wear will be somewhat slower until ridges 15 are encountered and worn to form continuous pocket perimeter contact. Afterwards the gradual increasing thickness of the ridges and the uniform distribution of lubricant over the whole surface of the distributor will render the wear very slight.

Along each longitudinal ridge 12 is an overflow passage 16 by means of which any surplus lubricant may return to the reservoir instead of being carried beyond the distributor plate to a point where it will drop from the journal outside of the lubricator or be thrown out by journal.

In order to accommodate variations in the relative positions of the journal and lubricator body without the necessity of separating the distributor from the journal and without interfering with the conduit for lubricant from the pump to the distributor, I provide tube 8 with a ball-like head 17 seated in a socket-like ring 18 in well 9. Head 17 is kept in place in ring 18 by means of a spring 19 compressed between the bottom of the distributor 10 and an upwardly facing surface on the tube. This surface is here shown as a collar 20 engaged by a pin 21. The collar is assembled with the tube by aligning its slot 22 with pin 21 and placing the collar upwardly over tube 8, until the pin has passed through these slots, then turning it ninety degrees. The collar may be provided with grooves 23 in which pin 21 may rest to prevent the collar from returning to the position in which its slots 22 are aligned with pin 21.

The distributor could be made of wood, brass, aluminum, or other suitable material and could be used with other lubricant supplying means besides the pump illustrated. The area of the distributor could be as great as necessary to efficiently serve the journal. Its use in addition to more evenly distributing the lubricant as before referred to, provides a journal contacting surface which is not subject to glazing or other deterioration as is waste and similar packing material.

I claim:

1. In a journal lubricator, a lubricant distributor including a rectangular frame, the perimeter of which is curved transversely of its plane to fit against the surface of a journal to be lubricated, each side of the distributor frame comprising spaced upstanding parallel ridges and a compressible packing between adjacent ridges, the edges of said ridges being adapted to contact with the surface of a journal to which the device is applied and having a relatively thin thickness to facilitate wearing down said edges to a true fit on said journal.

2. In a journal lubricator, a distributor concaved to fit against a journal and provided with ridges around its perimeter, and lubricant pockets within said perimeter formed by parallel spaced ridges arranged in zig-zag lines and connected by short transverse ridges.

3. In a journal lubricator, a distributor concaved to fit against a journal and provided with ridges around its perimeter, and lubricant pockets formed between the longitudinal center line of said distributor and the elevated edge thereof by zig-zag ridges extending lengthwise of the distributor and connected to the end ridges thereof.

4. In a journal lubricator, a distributor including perimetric ridges of inverted V-shape, and intermediate lubricant pocket forming ridges of inverted V-shape, the apices of said pocket forming ridges being of less height than the apices of said perimetric ridges.

5. In a journal lubricator, a lubricant distributor adjacent the journal to be lubricated, a lubricant reservoir below said distributor, means for elevating lubricant from said reservoir provided with a passage to said distributor which includes a vertical tubular member slidable in said distributor and having at its upper end an enlarged ball-like head within the latter, packing material surrounding said head and forming a socket-like bearing therefor, and yielding means thrusting said member downwardly.

6. In a journal lubricator, a lubricant distributor adjacent the journal to be lubricated, a lubricant reservoir below said distributor, means for elevating lubricant from said reservoir provided with a passage to said distributor which includes a vertical tubular member slidable in said distributor and having at its upper end an enlarged ball-like head within the latter, packing material surrounding said head and forming a socket-like bearing therefor, and a spring compressed between the bottom of said distributor and an upwardly facing surface on said member to hold the head of said member against said packing.

7. In a journal lubricator, a lubricant reservoir, a lubricant distributor plate upon said reservoir concaved to fit the contour of a journal to which it is applied and having a perimeter equipped with packing material for engaging the journal, means for pumping lubricant to said distributor, and an overflow passage leading from the upper portion of the curve of said plate but inside of its packing equipped perimeter.

In testimony whereof I hereunto affix my signature this 27th day of November, 1923.

JAMES J. HENNESSY.